United States Patent [19]
Ramakrishnan et al.

[11] Patent Number: 6,088,656
[45] Date of Patent: Jul. 11, 2000

[54] METHOD FOR INTERPRETING CARBONATE RESERVOIRS

[75] Inventors: Terizhandur S. Ramakrishnan, Bethel, Conn.; Raghu Ramamoorthy, Brighton, Australia; Naoki Saito, Davis, Calif.; Charles Flaum, Ridgefield, Conn.

[73] Assignee: Schlumberger Technology Corporation, Ridgefield, Conn.

[21] Appl. No.: 09/189,025

[22] Filed: Nov. 10, 1998

[51] Int. Cl.$^7$ .............................. G06F 19/00; G01V 3/38
[52] U.S. Cl. ..................... 702/13; 702/7; 702/8
[58] Field of Search ................. 702/10, 11, 12, 702/6, 7; 73/152.02, 152.05, 152.06; 324/338, 339

[56] References Cited

U.S. PATENT DOCUMENTS

| | | | |
|---|---|---|---|
| 4,468,623 | 8/1984 | Gianzero et al. | 324/367 |
| 4,953,399 | 9/1990 | Fertl et al. | 73/152.02 |
| 5,349,528 | 9/1994 | Ruhovets | 702/7 |
| 5,497,321 | 3/1996 | Ramakrishnan et al. | 702/12 |
| 5,675,147 | 10/1997 | Ekstrom et al. | 702/11 |
| 5,869,755 | 2/1999 | Ramamoorthy et al. | 73/152.05 |

OTHER PUBLICATIONS

Choquette, P. W. and Pray, L. C. Geologic Nomenclature and Classification of Porosity in Sedimentary Carbonates. *AAPG Bull.* 54, pp. 207–250, 1970.

Dunham, R. J. Classification of Carbonate Rocks According to Depositional Texture; Classification of Carbonate Rocks—a Symposium (ed. W. E. Ham), vol. 1. pp. 108–114, *AAPG Bull*, Houston, TX, 1962.

Ellis, Darwin V. *Well Logging for Earth Scientists*. Elsevier, New York (1987) pp. 201–224 and pp. 243–279.

Embry, A F. and Klovan, J. E. A Late Devonian Reef Tract on Northeastern Banks Island. N.W.T.: *Bull. Can. Pet. Geol.* 19, pp. 730–781, 1971.

Lucia, F. J. Petrophysical Parameters Estimated from Visual Description of Carbonate Pore Space. *J. Pet. Technol.* 35, pp. 629–637, 1983.

Luthi, S. and Souhaite, P. Fracture Apertures from Electrical Borehole Scans. *Schlumberger–Doll Research Note*. Ridgefield, CT, 1989.

N. Otsu. A Threshold Selection Method from Gray–Level Histograms. *IEEE Trans System, Man and Cybernetics*, SMC–9 (1): (1979) pp. 62–66.

Ramakrishnan. T. S. and Wilkinson, D. J. Water Cut and Fractional Flow Logs from Array Induction Measurements. *SPE Annual Technical Conference*, Paper No. SPE36503. Denver, CO, 1996.

Ramakrishnan. T.S. et al. A Petrophysical and Petrographic Study of Carbonate Cores from the Thamama Formation. SPE 49502, presented at the $8^{th}$ *Abu–Dhabi Int'l Petroleum Exhibition and Conf.*, Abu Dhabi, U.A.E.(Oct. 11–14, 1998).

*Schlumberger Log Interpretation Principles/Applications.* Schlumberger Educational Services, Houston, TX (1989), pp. 1–1 through 13–19.

Torres, D., Strickland, R., and Gianzero, M. A New Approach to Determining Dip and Strike using Borehole Images. *SPWLA 31st Logging Symposium.* Paper K, 1990.

Ye, S–J., Rabiller, P., and Keskes, N. Automatic High Resolution Sedimentary Dip Detection on Borehole Imagery. *SPWLA 38th Logging Symposium*. Paper O, 1997.

Yih, C. S., *Fluid Mechanics*. West River Press, Ann Arbor, MI, 1979, pp. 382–383.

*Primary Examiner*—Donald E. McElheny, Jr
*Attorney, Agent, or Firm*—William B. Batzer; Mark Levy

[57] ABSTRACT

An integrated interpretation methodology is described that evaluates carbonate reservoirs. The methodology consists of first classifying the rock facies. A geometrical model specific to the classification is then used to predict the response of the rock to a variety of stimuli. A reconstruction of the geometrical model is made by comparing the measurements with the model predictions. The model is then used to predict the resistivity and the hydraulic transport properties of the rock, thereby enabling computation of both the reserves and their production behavior.

12 Claims, 3 Drawing Sheets

METHOD FOR INTERPRETING CARBONATE RESERVOIRS

FIELD OF THE INVENTION

This invention pertains to well logging procedures and, more particularly, to an integrated method for interpreting and evaluating carbonate formations.

BACKGROUND OF THE INVENTION

More than fifty percent of the hydrocarbon reserves in the world are in carbonate reservoirs. Approximately twenty percent of the reserves in North American are in carbonate formulations.[1] Carbonate reservoirs are expected to dominate world oil production through the next century.

Most petrophysical interpretation techniques have been developed for siliciclastic formations. These procedures, however, are inadequate for predicting the producibility of the carbonate reservoirs, due to the complexity of their pore structure. For example, unlike sandstones, many carbonate sediments have a bimodal or even trimodal pore size distribution.[2] Organisms also play an important role in forming the reservoirs. Interpreting carbonate rocks is further complicated because they undergo significant diagenesis through chemical dissolution, reprecipitation, dolomitization, fracturing, etc. Anhydrite (anhydrous calcium sulfate) sequences are commonly present. The shape and size of the pore network is likely to be heterogeneous, even on a micro length scale. Pore sizes may range from microns to meters, often within a few feet.

Development of a quantitative petrophysical method that covers all features and aspects of carbonates is almost an insurmountable task. All of the aforementioned factors make interpreting these formations difficult.

This invention presents an integrated interpretation methodology for evaluating carbonate reservoirs. Early in the interpretation sequence, the methodology classifies the rock facies. A geometrical model specific to the classification is then used to predict the response of the rock to a variety of stimuli. A reconstruction of the geometrical model is made by comparing the measurements with the model predictions. The model is then used to predict the resistivity and the hydraulic transport properties of the rock, thereby enabling computation of both the reserves and their production behavior.

One of the novel features of the invention is that its geometrical model is dependent on the facies. The facies is deduced from a set of minimally processed logs. The basis for this is that some wellbore measurements are affected by the rock facies. A classification algorithm of the logs may then be used to associate each depth with a given facies. Once this is done, a facies dependent geometrical model is used to process the logs.

SUMMARY OF THE INVENTION

In accordance with the present invention, there is provided an integrated interpretation methodology for evaluating carbonate reservoirs. The methodology consists of classifying the rock facies. A geometrical model specific to the classification is then used to predict the response of the rock to a variety of stimuli. A reconstruction of the geometrical model is made by comparing the measurements with the model predictions. The model is then used to predict the resistivity and the hydraulic transport properties of the rock, thereby enabling computation of both the reserves and their production behavior.

It is an object of this invention to provide an improved method of interpreting carbonate rock formations.

It is another object of the invention to provide an interpretive scheme for computing both the reserves and production behavior of carbonate reservoirs.

It is a further object of this invention to provide an integrated scheme for interpreting carbonate rock that uses a geometrical model based on depositional facies.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the interpretation of well logging data for carbonate formations has always been a formidable task. Several authors have attempted classification schemes to develop a set of guidelines that may be applicable within a subgroup. The scheme that is most widely followed is that proposed by Dunham,[1] who separated carbonates into two classes: (1) where depositional texture is recognizable, and (2) where the original deposition is altered through recrystallization. The first class is subdivided as mudstone, wackestone, packstone, and grainstone.

Figure 1:
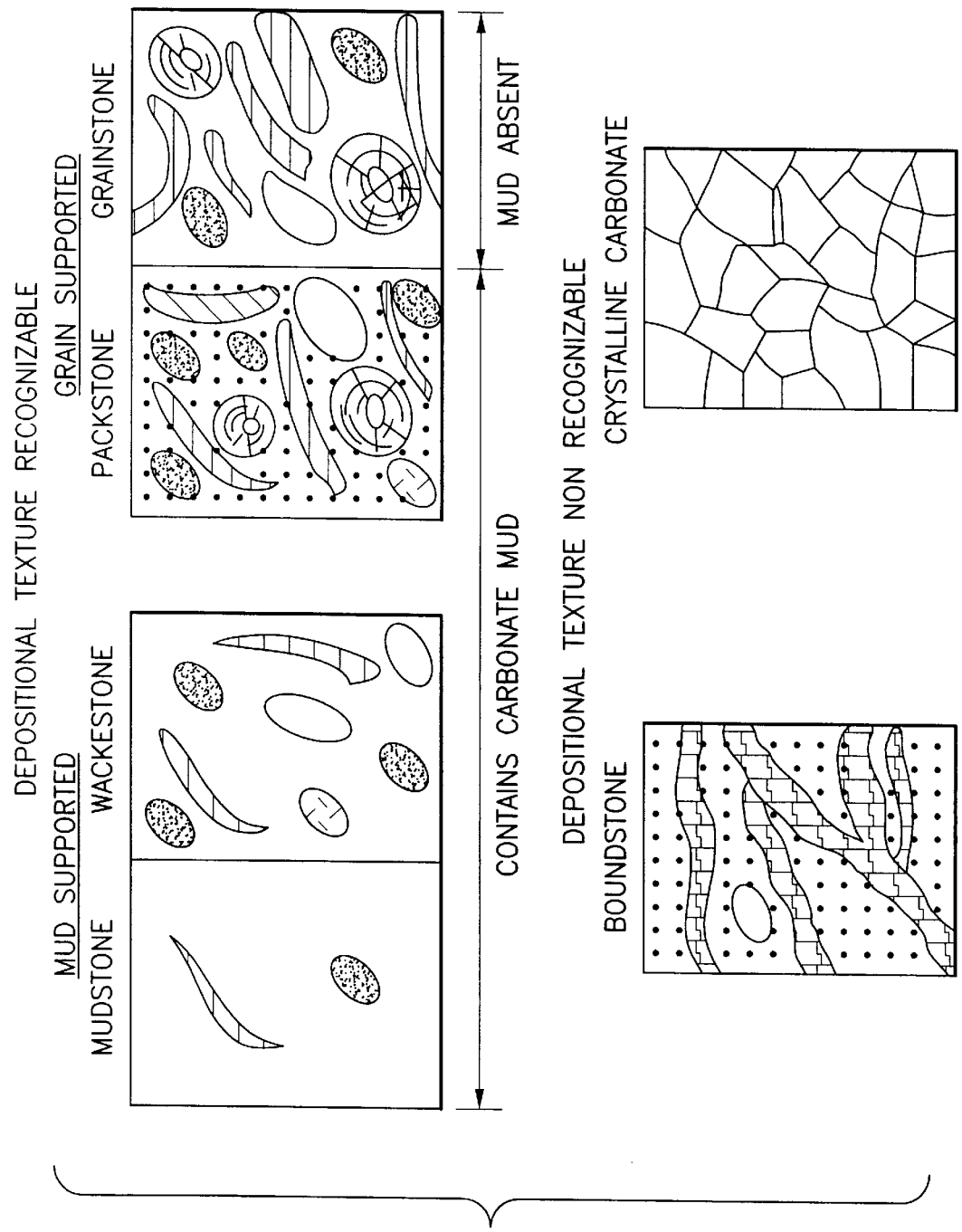
FIG. 1 illustrates a plurality of schematic views of the depositional texture of carbonate formations as classified by Dunham;[1]

Referring to FIG. 1, a schematic diagram of the texture based on the 1962 classification of Dunham is illustrated. This classification has been further amplified by Embry and Klovan.[3]

In contrast to Dunham, Choquette and Pray[4] have proposed a system wherein a dichotomy is made between fabric selective pore types such as interparticle, intraparticle, intercrystalline, etc., and nonfabric selective pore types such as fractures, channels and vugs.

Work by Lucia[5] proposes a simple classification based on pore space components. The pore space between particles is called interparticle porosity. All other pore space is labeled, "vuggy porosity". In Lucia's approach, vuggy porosity is the key to understanding the large variations in permeability and resistivity from standard sandstone models.

Figure 2:
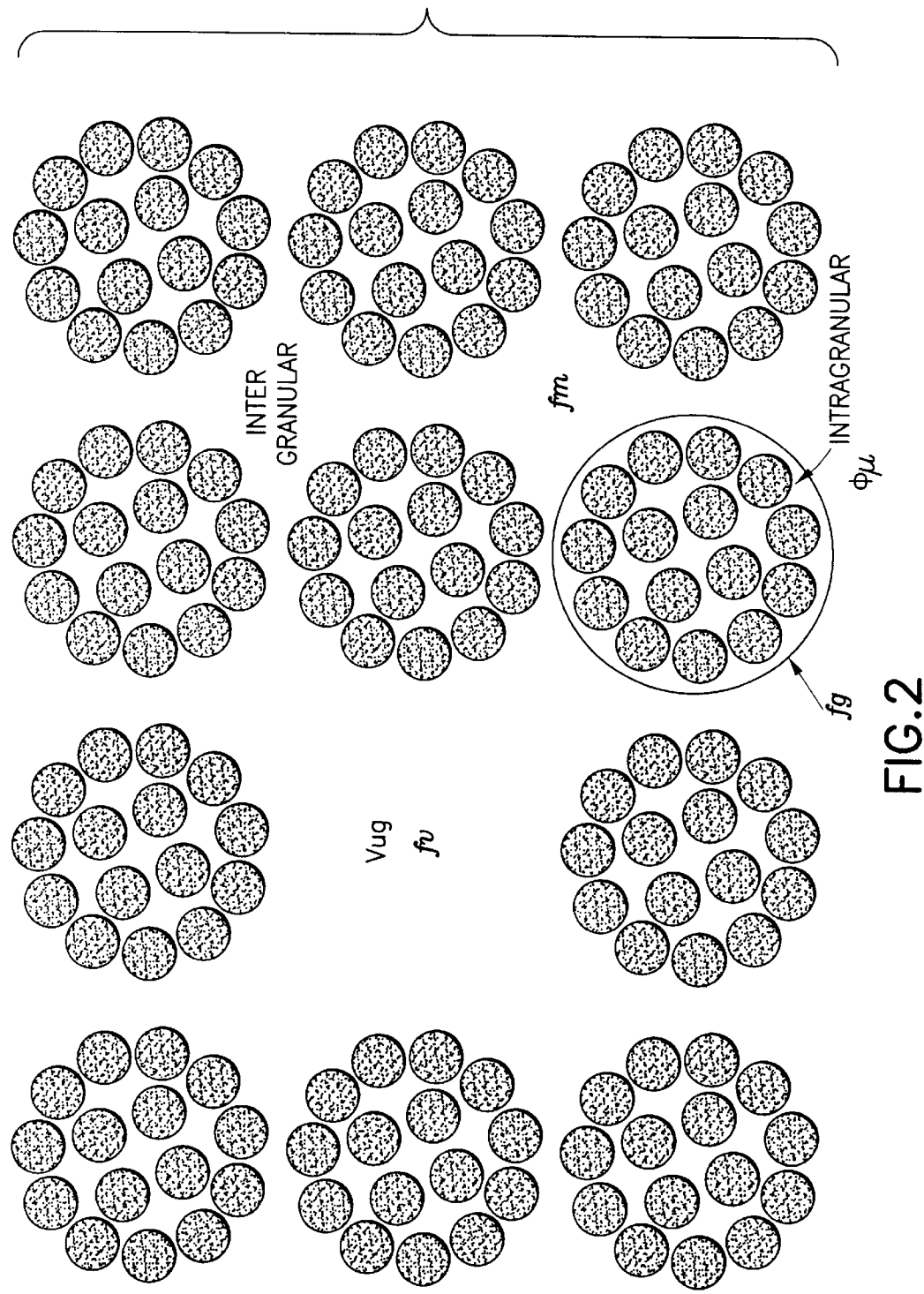
FIG. 2 depicts a schematic view of three porosity components of a rock matrix.

Referring to FIG. 2, a pore partitioning model is illustrated. The major components that appear to emerge are three distinct porosity contributors: intergranular, intragranular and vuggy porosity. All three components may be present in the grain-supported subdivision of Dunham. By their very nature, the inter- and intragranular separation in mudstones is ill-defined. Here only two pore types (vuggy and nonvuggy) are recognized. In addition to these pore types, the allowed nonfabric selective pore type is the fracture component. It is assumed that fractures occur sporadically, and the porous medium may be represented in between the fractures, as shown in FIG. 2.

The methodology represented in FIG. 2 reflects a pore space component classification based on studies of thin section analysis of the formations, employing both optical and scanning electron microscopes. The scheme of the invention covers a major cross-section of carbonates, and recognizes that, besides fractures, three qualitatively different contributors to porosity can occur. As aforementioned, porosity is partitioned into vuggy, intergranular and intragranular porosity. The pore space, excluding fractures, is thus an assembly of grains, separated by intergranular fraction $f_m$. Any grain(s) removed from the periodic arrangement will contribute to a vug fraction $f_v$. Vugs may range in size from hundreds of microns to centimeters. The remainder is occupied by the grain fraction $f_g$, which itself can be porous, with a porosity equal to $\phi_\mu$.

This model gives the classification of the grain assemblies consisting of both inter- and intragranular pores, as for example in a microporous grainstone. Note that:

$$f_v + f_m + f_g = 1 \quad (1)$$

$$f_v + f_m + f_g \phi_\mu = \phi \quad (2)$$

By definition:

$$f_\mu = f_g \phi_\mu \quad (3)$$

The above partitioning can be reduced to the classical notion of a grainstone (with no microporosity) when $\phi_\mu = 0$. Similarly when $f_m \to 0$, a mudstone is obtained. An intercrystalline rock with interdispersed vugs will have $\phi_\mu = 0$, but $f_v \neq 0$. (From a transport calculation perspective, when tithe the intergranular or intragranular porosity is zero, it is irrelevant whether $f_m = 0$ or $\phi$hd $\mu = 0$; but from a geological notion of sizes, it is necessary to have a consistent notation.)

For the same $f_m$ it is important to distinguish between packstone and wackestone, because transport property calculations are affected by the connectivity of the intergranular fraction, which they both contain. The geometrical rearrangement of inter- and intragranular pore spaces also changes some of the log responses and the determination of the parameters of the pore partitioning model. It is, therefore, important to recognize the lithofacies before any quantitative interpretation is attempted.

One of the fundamental steps of this invention is providing a consistent physics-based model for both inverse and forward calculations. To the extent possible, without introducing unnecessary complexity, the method applies the geometry of FIG. 2 to model the response to a variety of stimuli. For inverse problems involving grain-supported carbonates, measurements and parameters are computed, such as $f_m$, $f_v$ and the relevant length scales. These are then used to predict both the flow and electrical properties of the rocks. Rather than explaining the "anomalous" behavior of carbonates through ad hoc correlations, as much as possible, the inventive method bases interpretation upon calculations arising from an application of physics.

Combined Interpretation Methodology

The motivation for combining inferences from measurements obtained from diverse tools is that different tools are sensitive, to varying degrees, to different components of porosity. Obviously, a joint interpretation of all of the available responses can be used to invert for the various parameters of FIG. 2. Currently, this is not practical. The data quality can vary depending on the measurement type. Moreover, user judgment on measurement acceptability for interpretation is important. For example, FMI is limited in the resolution of vugs, whereas the shear modulus is sensitive to pore shape and porosity.[6] (FMI, which stands for Fullbore Formation MicroImage, is a commercial service offered by Schlumberger Technology Corporation, the assignee of this application, and is described for example in U.S. Pat. No. 4,468,623 to Gianzero et al. FMI provides an electrical resistivity image of the wellbore wall.) Assuming that vugs are spherical, a compromise between the image and acoustic data is necessary, depending on the applicability of each data type. Therefore, as a compromise, a hybrid method (explained in more detail below) incorporates a variety of tools and solves for pore space heterogeneity. While the method is somewhat sequential, it incorporates many physics features of joint interpretation.

Preferred Interpretation Sequence

Figure 3:
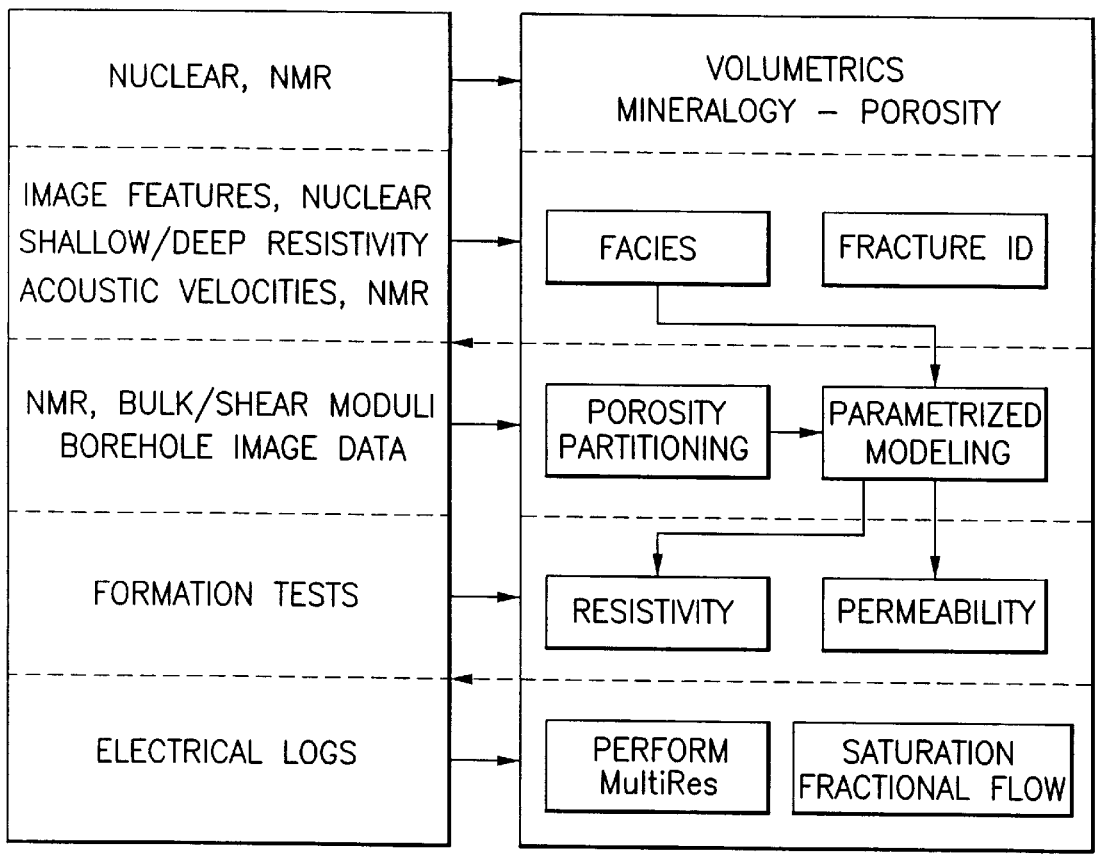
FIG. 3 shows a block diagrammatical view of the integrated methodology for carbonate formations, in accordance with this invention.

The inventive sequential interpretation procedure is illustrated in FIG. 3. As in siliciclastics, rock volumetrics are obtained in the first step without regard to pore space heterogeneity. Without any input on the details of the invention processes, volumetrics (i.e., porosity and mineralogy) are deduced from nuclear responses[17 & 18] Here total porosity from NMR measurement may also be used.

Once the above step is completed, the fractures are identified and separated from the matrix, for which the integrated interpretation is applicable. This approach is valid only if the fractures are sufficiently well separated for the measurements to be reflective of the intervening matrix. For identification and quantification of fractures, a number of methods are possible (STFrac, Frac View, Bennett et al.[7]). The preferred method uses the Hough transform. This method identifies planar events intersecting a cylindrical borehole.

Once a planar event is identified, a distinction is made based on whether it is a bed-boundary or a fracture. The distinction can be made by the user or, preferably, by a computer algorithm. An open fracture is likely to be more conductive (assuming conductive water-based mud) than the surrounding strata, whereas a healed fracture is likely to show up as a nonconductive streak. In contrast, a bed-boundary is indicated by a monotonic transition from one bed property to another. The exception may be thin conductive beds that at first pass may appear as a fracture except for the correlation with surrounding dips. An evaluation of properties on adjacent sides of an identified planar event is necessary to subclassify the event as one of the three possibilities.

To build a useful reservoir model, it is necessary to associate a hydraulic conductivity with the open fractures. The permeability of a fracture of aperture $W_f$ is $W_f^2/12$.[2] to determine the fracture aperture, an algorithm is employed, using methods of either Luthi and Souhaite,[8] or Chen.[9] Both algorithmic methods rely on the magnitude of currents emanating from an electrical button array, as in the FMI. Chen's algorithm is based on determining A', the integrated excess button current, normalized by the background current around the planar event. A' can be computed once the fracture is detected. A sinusoidal window is opened along the fracture and the current is integrated inside the window. A value is also obtained for the background current by averaging the current values of the surrounding regions, that are not affected by the existence of the fracture. The method defines $R_{mf}$ (the resistivity of the mud filtrate) as the resistivity of the fracture. Also, the resistivity of the formulation $r_{xo}$ is considered uniform in an area larger than the button size. Then the fracture aperture $W_f$ is estimated as follows:

$$W_f = A'/[(R_{xo}/R_{mf}) - 1] \qquad (4)$$

Figure 4:
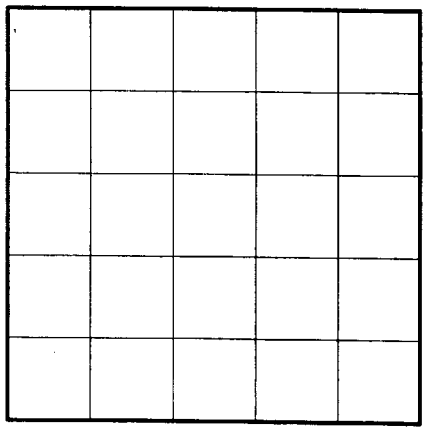
FIG. 4 illustrates a schematic diagram of two possible pore arrangements with the same porosity and pore size distribution, but with different permeabilities.
Figure 4:
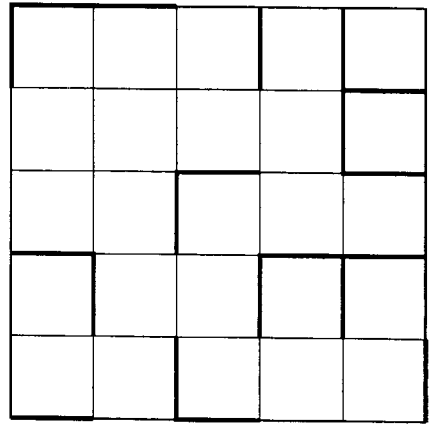

At this stage, the next level in the sequence is achieved, viz., lithofacies identification. The importance of facies in permeability correlations has been well recognized by geologists. For a fixed pore size distribution, the spatial arrangement of pores can give rise to completely different bulk properties. An example of this is illustrated in FIG. 4, in which a connected set of large pores akin to a grainstone (left side) gives rise to a higher permeability than does a random arrangement (right side) with pores of two different sizes. In FIG. 4, the thick lines refer to large pore sizes whereas the thin lines refer to small pores. In the left side of FIG. 4, large pores form a connected pathway and hence have a substantially smaller resistance to flow than the one on the right.

For the purpose of the invention, facies is a classifier that requires the use of different geometrical packing models for transport property predictions. This is illustrated as a facies switch, in FIG. 3. For each facies value, a specific parameterized model is used to predict resistivity and permeability.

For facies identification, a logging suite consisting of a standard set of logs combined with feature vectors obtained from borehole imaging, may be used to distinguish depositional textures/facies. A detailed description of this is available from Saito et al.[10] The main conclusion in this description is that a broad classification of carbonate rocks may be made from borehole imaging. The classification comprises grain-supported and mud-supported media. In the former, an aggregate of microporous grains forms the medium. In the latter, mud (calcite crystals of about 1 µm) forms the medium. The two models form distinct groups, when the response to a variety of tools is considered.

For reasons mentioned hereinabove, the inventive scheme is a simplified, but practical form of a joint inversion. Accordingly, porosity is divided into its components, as indicated in FIG. 2. The vug fraction may be obtained in one of two ways: acoustic and image. Acoustic shear modulus is fairly independent of the pore fluid type and is sensitive predominantly to porosity, mineralogy, and the pore shape. It is weakly dependent on the extent of microporosity. Using a combination of acoustic theory (for the effect of near-spherical voids) and empirical shear modulus curves for intergranular systems, the spherical porosity fraction may be estimated. Based on petrography studies and acoustic sensitivity analysis conducted by the assignee, the acoustically-derived spherical porosity has been associated with the vug fraction. The description of acoustically derived spherical porosity is given by Ramamoorthy.[11]

The alternative method utilizes borehole images, in which vugs may appear as conductive inclusions. A borehole electrical image responds to these inclusions, since an excess of current compared to the background is admitted through them. The presence of such a vug region of conductivity $\sigma_m$ in a background medium of conductivity $\sigma_{xo}$, an be modeled analytically. In the dilute limit $f_v \to 0$, it can be demonstrated that image processing algorithms such as those of Otsu[12] may be applied to separate the image into vugs and homogeneous background. As a general prescription, for an electrode button diameter of 5 mm, $f_v$ can be computed from the image if the vug diameter is greater than about 6 mm.

A reconciliation between acoustic and imaged based $f_v$ is necessary. For example, image based $f_v$ may be higher than the true value for two reasons: (1) vugs within the formation may also give rise to anomalous high conductivity patches, and (2) the button size limits the vug size for which an accurate estimation of $f_v$ may be made. In contrast, the acoustic method relies upon the shape of the vugs being nearly spherical. The interpretation quality is independent of size, but varies with shape. Also, the acoustic method is error prone at low porosities. Given these factors, a judgment by the user is needed to decide between the two methods.

After the vug fraction is obtained, the remaining step consists of obtaining the inter- and intragranular fractions. The main measurement sensitive to pore size is nuclear magnetic resonance (NMR), since the intragranular fraction consists of pores ranging from submicrons to a few microns. Traditional NMR relaxation in water saturated rocks is based on the assumption that the characteristic time scale of relaxation in any pore is controlled by surface relaxivity, $\rho$. If the bulk relaxation time is $T_{2b}$, the relaxation rate for a pore of volume to surface ration $V_s$ is:

$$1/T_2 = \rho/V_s + 1/T_{2b} \qquad (5)$$

Given a volume density function $g(T_2)$ of transverse relaxation times, the measured magnetization is given by $$M(t) = \int_0^\infty g(T_2) \exp(-t/T_2) dT_2 \qquad (6)$$

The simple wisdom of NMR interpretation has been to output a distribution of $T_2$ (i.e., $g(T_2)$). It is then presumed that this distribution is directly linked to the pore size distribution through the relationship of Equation 5. The basis for this presumption is that each pore acts independently of the other and the diffusion of magnetization between two pores is negligible.

In grain-supported carbonates, given the proximity of intergranular and intragranular pores, diffusion of magnetization between the two pore systems cannot be neglected.[15] A model based inversion of $M(t)$ data may be used to invert for three geometric quantities, in addition to porosity. These are the intergranular fraction $f_m$, the intergranular volume to surface ratio $V_{sm}$, and the intragranular volume to surface ration $V_{s\mu}$. It is assumed that an extension of this inversion method can include the effect of vugs and hydrocarbons. Here again, some degree of reconciliation is necessary with regard to $f_v$. Furthermore, any hydrocarbon saturation obtained through NMR processing must have a degree of consistency with resistivity interpretation. Otherwise, an iterative process is necessary if the depth and the resolution of investigation is the same for all of the tools. Note: The NMR measurement being shallow will see a hydrocarbon fraction equivalent to the residual oil saturation, $S_{or}$, i.e., the oil saturation in the zone flushed by mud filtrate. A simple one-pass method must be accepted, when unresolved differences in $f$, and $S_{or}$ between NMR and other tools are allowed to exist and when the investigating volumes of the tools are disparate. To a small extent, the same is true for the intragranular fraction's contribution to porosity, denoted $f_\mu$. As an example, the sonic interpretation is weakly affected by the presence of microporosity.[11] In the first pass of sonic $f_v$ calculation, it can be assumed that $f_\mu$ is 0. Once the NMR porosity partitioning is completed, a consistency check is required with the acoustics calculation. Again, if gross discrepancies appear, an iterative correction is necessary.

For mud-supported carbonates, a completely different approach is needed. It is preferable to construct a model in which $f_m=0$, but one in which the $T_2$ values correspond substantially to the pore sizes in accordance with Equation 5. The fluid(s) in the vugs relax with bulk relaxivity. In waterwet media the hydrocarbon also relaxes as per its bulk relaxivity.

The NMR interpretation, more than any other, relies on the facies switch, because it is strongly affected by the presence of microporosity. To a less extent, the acoustic modeling is also altered. In acoustics, the mud supported case is automatically accounted for by simply letting $f_\mu=0$ or $f_\mu=1-f_v$.

From Interpretation to Prediction

The final steps in the inventive methodology consist of building an appropriate resistivity and permeability model from the porosity partitioning inputs (e.g., $\phi$, $f_m$, $f_v$.) and the relevant pore sizes obtained from $V_{sm}$ and $V_{s\mu}$. The transport models are based on FIG. 2. It may be shown[16] that in a fully water saturated rock, the fluid conductivity of which is $\sigma_f$, the effective conductivity $\sigma$ is:

$$f_m \approx (\sigma_f/\sigma)^{[(m_m-1)/m_m]}[(\sigma_s-\sigma)/(\sigma_s-\sigma_f)] \quad (7)$$

where $m_m$ is a cementation index that reflects the "tortuosity" of the intergranular fluid pathways. The tortuosity of the intragranular packing is captured in $\sigma_s$ through a cementation index $m_\mu$. An Archie relation $\sigma_s=\sigma_n\phi_\mu^{m_\mu}$, where $\phi_\mu$ is the intrinsic intragranular porosity can be used in Equation (7) to get $\sigma$. This gives the effective cementation exponent m, through $\sigma=\sigma_n\phi^m$.

If $f_v \neq 0$, the value of $\sigma$ calculated above is substituted in the symmetric Bruggeman result $$\sum_{i=1} f_i(\sigma_i-\sigma)/(\sigma_i+2\sigma)=0 \quad (8)$$

where the first constituent has a fraction $1-f_v$ and has the conductivity of inter- and intragranular mixture obtained from FIG. 7. (See, e.g., Landaner, R., *Electrical Conductivity in Inhomogeneous Media in Electrical Transport and Optical Properties of Inhomogeneous Media,* American Institute of Physics (1978), pp. 2–43.) The fraction $f_m$ must be divided (normalized) by $1-f_v$ in this computation. The second constituent has the conductivity $\sigma_2\sigma_n$, and a fraction $f_v$. It is then straightforward to compute the effective m of the three-component mixture.

For a partially saturated rock, for simplicity, it is recommended that an Archie relation be used, with the cementation and saturation exponents equal to the effective m. This is not entirely adequate because in mixed saturation environments, an Archie relation is not satisfied. The deviation from classical behavior is dependent on the extent of the pore size separation between micro- and macropores. Vugs may be thought of as infinitely larger than the other two. In any multi-component pore system, capillary equilibrium determines the aqueous phase saturation with each. Making simplifying assumptions regarding the nature of the capillary pressures, based on the inter- and intragranular pore sizes allows a derivation of a non-Archie saturation equation. Given the nature of assumptions involved (e.g., constancy of surface relaxivity), the additional complications in deriving the non-Archie relation may be unwarranted. Whatever method is pursued, at the end of this stage a saturation equation is available.

In addition to the conductivity-saturation equation, permeability predictions may also be made from first principles. Accordingly, in a manner similar to Equation 7:

$$f_m \approx (\lambda_m/\lambda)^{[(m_m-1)/m_m]}[(\lambda_\mu\lambda)/(\lambda_\mu\lambda_m)] \quad (9)$$

Here variables $\lambda$ are the mobilities in intergranular (m) or intragranular ($\mu$) pores. The important point in the above equation is that $\lambda_m$ has been used in lieu of "fluid conductivity." The intergranular hydraulic conductivity $\lambda_m$ is $\approx r^2_m/C_m$, where $r_m$ is the intergranular pore size and $C_m$ is a hydraulic constant. Variable $r_m$ is computed from $V_{sm}$, obtained from the NMR inversion. For the micro- or intragranular pore, $\lambda_\mu$ is given by $r^2_\mu/(F_\mu C_\mu)$, where $r_\mu$ is the intragranular pore size (obtained from $V_{s\mu}$, again estimated from NMR inversion), $F_\mu$ is the formation factor for the pore network within the grains, and $C_\mu$ is the hydraulic constant for the microporous grain. The inclusion of vugs is carried out just as in the case of conductivity calculation, except that the vug fraction $f_v$ is assigned infinite hydraulic conductivity. With the symmetric Bruggeman approximation, this gives rise to the effective mobility of the three component mixture as $$\lambda = \frac{\lambda_{m\mu}}{1-3f_v}$$

where $\lambda_{m\mu}$ is the effective mobility of the macro-micro mixture of EQUATION 9.

Resistivity Interpretation

Once the conductivity-saturation relation is worked out, with the assumption that an array of resistivity logs with different depths of investigation is available, an estimate of flow performance can be obtained.[6] The results of this calculation give information ranging from connate water saturation, fractional flow characteristics of the formation (which, in turn, provides instantaneous watercut), and the residual oil and water saturations.

Reservoir Simulation

To calculate the performance of a reservoir, the quantities derived in the carbonate interpretation methodology are needed. Porosity, permeability, saturation and fractional flow or relative permeabilities are the basic inputs required for simulation. To derive these quantities porosity partitioning and the relevant length scales of the components of porosity as shown in the methodology is important.

It has been shown through the integrated interpretation methodology described above that all of these quantities can be derived. In particular, method steps comprise:

a) obtaining porosity and lithography as the first step;

b) identifying the facies of the rock to be either grain supported or mud supported;

c) specific to the facies, computing the vuggy component of porosity from either borehole images or acoustic methods;

d) then reconciling the two vuggy component calculations;

e) for grain supported facies, estimating inter- and intragranular porosity and the relevant pore length scales from NMR; or f) for mud supported facies, estimating the relevant pore length scales from NMR;

g) reconciling inconsistencies between acoustic, image and NMR methods;

h) classifying the porosity into the three components, with the associated length scales;

i) building a resistivity model for the microscopically heterogeneous system;

j) building a permeability model for the microscopically heterogeneous system; and k) using the resistivity model, analyzing array resistivity logs for computing invasion profiles and provide reserves, residual oil, water, and fractional flow characteristics.

REFERENCES

1. Dunham, R. J., *Classification of Carbonate Rocks According to Depositional Texture; Classification of Carbonate Rocks.* a Symposium (ed. W. E. Ham), AAPG Bull, Houston, Tex., Vol. 1. (1962) pp. 107–8,2.
2. Yih, C. S., *Fluid Mechanics.* West River Press, Ann Arbor, Mich., (1979).
3. Embry, A F. and Klovan, J. E., *A Late Devonian Reef Tract on Northeastern Banks Island.* N.W.T.: Bull Can. Pet. Geol. 19, (1971) pp. 730–781.
4. Choquette, P. W. and Pray, L. C., *Geologic Nomenclature and Classification of Porosity in Sedimentary Carbonates.* AAPG Bull. 54, (1970) pp. 207–250.
5. Lucia, F. J., *Petrophysical Parameters Estimated from Visual Description of Carbonate Pore Space.* J. Pet. Technol. 35 (1983) pp. 626–637.
6. Ramakrishnan, T. S. and Wilkinson, D. J., *Water Cut and Fractional Flow Logs from Array Induction Measurements.* SPE Annular Technical Conference, Paper No. SPE 36503, Denver, Colo., (1966).
7. Bennett, N., Burridge, P., and Saito, N., *Method of Determining Dips and Azimuths of Fractures from Borehole Images.* Copending U.S. patent application Ser. No. 923,610, filed Sep. 5, 1997.
8. Luthi, S. and Souhaite, P., *Fracture Apertures from Electrical Borehole Scans.* Schlumberger-Doll Research Note, Ridgefield, Conn., (1989).
9. Chen, M. Y., *New Estimation Algorithm for Fracture Apertures from Electrical Borehole Scan.* Schlumberger-Doll Research Note, Ridgefield, Conn. (1996).
10. Saito, N., Rabaute, A., and Ramakrishnan, T. S., *Automated Lithofacies Identification for Petrophysical Interpretation.* Copending U.S. patent application Docket No. S-60.1334, filed via Express Mail (Nov. 5, 1998)
11. Ramamoorthy, R., Johnson, D. L., and Murphy III, W. F., *Vuggy Porosity Estimation in Carbonate Rocks from Shear Modulus.* Copending U.S. patent application Ser. No. 001,904, filed (Sep. 5, 1997).
12. N. Otsu, *A Threshold Selection Method from Gray-Level Histograms.* IEEE Trans. System, Man and Cybernetics, SMC-9(1):(1979) pp. 62–66.
13. Torres, D., Strickland, R., and Gianzero, M., *A New Approach to Determining Dip and Strike using Borehole Images.* SPWLA 31st Logging Symposium, Paper K, 1990).
14. Ye, S-J., Rabiller, P., and Keskes, N., *Automatic High Resolution Sedimentary Dip Detection on Borehole Imagery.* SPWLA 38th Logging Symposium, Paper O (1997).
15. Ramakrishnan, T. S. et al., *Method for Estimating Pore Structure in Carbonates from NMR Measurements.* Copending U.S. patent application Ser. No. 08/932,141, filed (Sep. 16, 1997).
16. Ramakrishnan, T. S. et al., *A Petrophysical and Petrographic Study of Carbonate Cores from the Thamama Formation.* SPE 49502, presented at the $8^{th}$ Abu-Dhabi Int'l Petroleum Exhibition and Conf., Abu Dhabi, U.A.E. (Oct. 11–14, 1998).
17. Ellis, Darwin V., *Well Logging for Earth Scientists.* Elsevier, New York (1987).
18. *Schlumberger Log Interpretation Principles/Applications.* Schlumberger Educational Services, Houston, Tex. (1989).

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An integrated interpretation method for evaluating carbonate reservoirs, comprising the steps of:

a) estimating porosity and mineralogy;

b) classifying formation lithofacies;

c) generating a common geometrical model specific to the classification of step (b), in order to predict a response of the formation to a variety of stimuli;

d) making and comparing measurements with the results predicted by said generated common geometrical model of step (c);

e) adjusting the parameters of the said geometric model in order to best fit the measurements;

f) using the geometrical model derived from step (e) to predict resistivity and hydraulic transport properties of the formation; and g) computing both the reserves and production behavior of said formation.

2. An integrated interpretation method for evaluating carbonate reservoirs, comprising the steps of:

a) obtaining porosity and lithology of a carbonate formation;

b) identifying facies of said carbonate formation of step (a) as one of either a grain supported or mud supported carbonate;

c) specific to the facies identified in step (b), computing a vuggy component of porosity;

d) classifying the porosity into components with associated length scales; and e) building resistivity and permeability models.

3. The integrated interpretation method for evaluating carbonate reservoirs in accordance with claim 2, further comprising the step of:

f) using the resistivity model and analyzing array resistivity logs for computing invasion profiles and for providing reserves, residual oil and water and fractional flow characteristics.

4. The integrated interpretation method for evaluating carbonate reservoirs in accordance with claim 2, wherein, in step (c), the vuggy component is derived from borehole images.

5. The integrated interpretation method for evaluating carbonate reservoirs in accordance with claim 2, wherein, in step (c), the vuggy component is derived by acoustic methods.

6. The integrated interpretation method for evaluating carbonate reservoirs in accordance with claim 2, wherein, in step (c), the vuggy component is derived by utilizing both borehole images and acoustic methods.

7. The integrated interpretation method for evaluating carbonate reservoirs in accordance with claim 6, further comprising the step of:

f) reconciling calculations of the methods used to obtain the vuggy components.

8. The integrated interpretation method for evaluating carbonate reservoirs in accordance with claim 2, further comprising the step of:

f) utilizing said facies of step (b) to estimate for grain-supported facies, inter- and intra-granular porosities and relevant pore length scales.

9. The integrated interpretation method for evaluating carbonate reservoirs in accordance with claim 2, further comprising the step of:

f) utilizing said facies of step (b) to estimate for mud-supported facies, relevant pore length scales.

10. The integrated interpretation method for evaluating carbonate reservoirs in accordance with claim 8, wherein said estimate is obtained using NMR techniques.

11. The integrated interpretation method for evaluating carbonate reservoirs in accordance with claim 9, wherein said estimate is obtained using NMR techniques.

12. An integrated interpretation method for evaluating carbonate reservoirs, comprising the steps of:

a) estimating porosity and mineralogy;

b) classifying formation lithofacies;

c) generating a common geometrical model specific to the classification of step (b), in order to predict a response of the formation to a variety of stimuli;

d) making and comparing measurements with the results predicted by said generated common geometrical model of step (c);

e) adjusting the parameters of the said geometric model in order to best fit the measurements;

f) using the geometrical model derived from step (e) to predict properties of the formation; and g) evaluating said formation.

* * * * *